(12) United States Patent
Yoshizaki et al.

(10) Patent No.: US 9,352,828 B2
(45) Date of Patent: May 31, 2016

(54) VIBRATION REDUCING APPARATUS

(71) Applicant: MITSUBISHI HEAVY INDUSTRIES, LTD., Tokyo (JP)

(72) Inventors: Yuji Yoshizaki, Tokyo (JP); Hidetoshi Suzuki, Tokyo (JP); Hiroshi Ito, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 98 days.

(21) Appl. No.: 14/380,269

(22) PCT Filed: Mar. 19, 2013

(86) PCT No.: PCT/JP2013/057775
§ 371 (c)(1),
(2) Date: Aug. 21, 2014

(87) PCT Pub. No.: WO2013/141228
PCT Pub. Date: Sep. 26, 2013

(65) Prior Publication Data
US 2015/0014477 A1 Jan. 15, 2015

(30) Foreign Application Priority Data
Mar. 23, 2012 (JP) .................... 2012-066872

(51) Int. Cl.
*B64C 27/00* (2006.01)
*B64C 27/51* (2006.01)
(Continued)

(52) U.S. Cl.
CPC .......... *B64C 27/001* (2013.01); *B64C 27/51* (2013.01); *F16F 7/104* (2013.01); *F16F 7/1005* (2013.01);
(Continued)

(58) Field of Classification Search
CPC ............. B64C 2027/004; B64C 2027/005; B64C 27/001; B64C 27/51; F16F 7/1005; F16F 7/104; F16F 7/116; F16F 15/02
See application file for complete search history.

(56) References Cited

U.S. PATENT DOCUMENTS

| 4,724,923 A * | 2/1988 | Waterman ............... F16F 15/03 181/208 |
| 7,331,235 B2 * | 2/2008 | Aubourg ............... B64C 27/001 244/17.13 |

(Continued)

FOREIGN PATENT DOCUMENTS

| EP | 1 669 634 | 6/2006 |
| FR | 2 825 769 | 12/2002 |

(Continued)

OTHER PUBLICATIONS

International Preliminary Report on Patentability and Written Opinion of the International Searching Authority issued Sep. 23, 2013 in corresponding International (PCT) Application No. PCT/JP2013/057775.

(Continued)

*Primary Examiner* — Justin Benedik
(74) *Attorney, Agent, or Firm* — Wenderoth, Lind & Ponack, L.L.P.

(57) ABSTRACT

A compact vibration reducing apparatus includes a dynamic mass; elastic member which apply elastic force to the dynamic mass so that the dynamic mass vibrates in a parallel to a vibration damping direction; a control mass; an actuator which move in parallel to a length change direction; and a motion direction converting mechanism which moves the control mass to the dynamic mass so that the control mass moves in a vibration damping direction to the dynamic mass through the operation of the actuator. The actuator is supported by the dynamic mass so that the operation direction of the actuator is not parallel to the vibration damping direction.

11 Claims, 9 Drawing Sheets

(51) Int. Cl.
*F16F 7/116* (2006.01)
*F16F 7/10* (2006.01)
*F16F 7/104* (2006.01)
*F16F 15/02* (2006.01)

(52) U.S. Cl.
CPC .......... *F16F 7/116* (2013.01); *F16F 15/02* (2013.01); *B64C 2027/004* (2013.01); *B64C 2027/005* (2013.01)

(56) References Cited

U.S. PATENT DOCUMENTS

| | | | | |
|---|---|---|---|---|
| 7,370,829 | B2* | 5/2008 | Badre-Alam | B64C 27/001 180/312 |
| 8,164,737 | B2* | 4/2012 | Butler | G03F 7/70883 188/378 |
| 8,413,923 | B2* | 4/2013 | Brenner | B64C 27/001 244/17.11 |
| 8,499,907 | B2* | 8/2013 | Smith | B64C 27/001 188/316 |
| 8,695,917 | B2* | 4/2014 | Cranga | B64C 27/001 188/379 |
| 8,899,928 | B2* | 12/2014 | Girard | B64C 27/001 416/144 |
| 2003/0173725 | A1 | 9/2003 | Noe | |
| 2007/0273074 | A1 | 11/2007 | Mizuno et al. | |
| 2010/0057260 | A1 | 3/2010 | Fallahi | |
| 2013/0011260 | A1* | 1/2013 | Yoshizaki | B64C 27/001 416/145 |

FOREIGN PATENT DOCUMENTS

| | | |
|---|---|---|
| JP | 59-50243 | 3/1984 |
| JP | 2-77343 | 6/1990 |
| JP | 2009-138893 | 6/2009 |
| JP | 2010-174550 | 8/2010 |
| JP | 2011-169382 | 9/2011 |
| JP | 2011-179527 | 9/2011 |
| WO | 2011/115488 | 9/2011 |

OTHER PUBLICATIONS

Extended European Search Report issued Nov. 5, 2015 in corresponding European Patent Application No. 13764141.1.
International Search Report issued Apr. 16, 2013 in International (PCT) Application No. PCT/JP2013/057775.
M. R. Smith, R. J. Pascal, T. Lee, F. B. Stamps, M. C. van Schoor, B. P. Masters, C. Blaurock, E. F. Prechtl, J. P. Rodgers, D. J. Merkley, "Results From the Dynamically Tailored Airframe Structures Program", American Helicopter Society 58th Annual Forum, Jun. 11-13, 2002.
Decision to Grant a Patent issued Nov. 24, 2015 in corresponding Japanese Application No. 2012-066872 with partial English translation.

* cited by examiner

VIBRATION REDUCING APPARATUS

TECHNICAL FIELD

The present invention is related to a vibration reducing apparatus, and especially to a vibration reducing apparatus which is used to reduce vibration.

BACKGROUND ART

A helicopter is known which can carry out the vertically rising and falling of the fuselage, the forward movement and backward movement, and the aerial stop, by rotating a main rotor. When the helicopter has N main rotor blades (N is a natural number), the N/Rev vibration is caused due to the rotation of the main rotor. Moreover, in the helicopter, when the helicopter receives a wind or when the helicopter turns over suddenly, there is a case that the number of rotations of the main rotor changes so that the frequency of the N/Rev vibration changes. In the helicopter, good habitability is desired and it is desired to reduce the vibration which is propagated to passengers of the helicopter.

A vibration reducing apparatus is known which is installed in the helicopter to reduce the vibration which is propagated to the passengers of the helicopter. It is required that such a vibration reducing apparatus is more compact.

The vibration reducing apparatus is disclosed in JP 2011-169382A (Patent Literature 1) which reduces the vibration of a vibration damping object more surely. The vibration reducing apparatus includes an elastic body and a dynamic mass supported by the vibration damping object through the elastic body, a control mass and an actuator for moving the control mass to the dynamic mass. Such a vibration reducing apparatus moves the control mass appropriately to the dynamic mass, so that the frequency and amplitude of vibration of the dynamic mass to the vibration damping object can be changed and the vibration of the vibration damping object can be reduced more surely.

A vibration reducing apparatus is disclosed in JP 2009-138893A (Patent Literature 2) in which energy loss is small and vibration damping of a vibration body is possible. The vibration reducing apparatus includes a measuring unit provided for a structure and configured to measure the frequency and amplitude of vibration of the structure in up and down directions, a vibration damping unit provided for a pillar or a stake of the structure and configured to generate vibration damping force in the up and down directions, and a control unit configured to control the magnitude of the vibration damping force based on the frequency and amplitude of vibration of the structure measured by the measuring unit. In the vibration reducing apparatus, the vibration damping unit includes a vibration applying unit vibrating in up and down directions, and a variable stiffness spring provided between the vibration applying unit and the pillar or the stake. The control unit drives the vibration applying unit to vibrate based on the amplitude of vibration, and changes the stiffness of the variable stiffness spring based on the frequency.

The technique to reduce vibration through movement a liquid sinker by using an actuator having a piezo device is disclosed in literature "Results from the dynamically tailored airframe structures program"

CITATION LIST

[Patent Literature 1] JP 2011-169382A
[Patent Literature 2] JP 2009-138893A

[Non-Patent Literature 1] M. R. Smith, R. J. Pascal, T. Lee, F. B. Stamps, M. C. van Schoor, B. P. Masters, C. Blaurock, E. F. Prechtl, J. P. Rodgers, D. J. Merkley, "Results from the dynamically tailored airframe structures program", American helicopter Society $58^{th}$ Annual Forum, 2002

SUMMARY OF THE INVENTION

An object of the present invention is to provide a more compact vibration reducing apparatus.

Another object of the present invention is to provide s helicopter in which the vibration transferred to a passenger is smaller.

Another object of the present invention is to provide a helicopter manufacturing method for more easily manufacturing the helicopter in which the vibration transferred to a passenger is smaller.

The vibration reducing apparatus of the present invention includes a dynamic mass, an elastic member, a control mass, an actuator and a motion direction converting mechanism. The elastic member applies elastic force to the dynamic mass such that the dynamic mass vibrates in parallel to a vibration damping direction to a vibration damping object. The actuator elongates and contracts in an operation direction. The motion direction converting mechanism moves the control mass to the dynamic mass such that the control mass moves to the vibration damping direction to the dynamic mass through the operation of the actuator. The actuator is supported by the dynamic mass such that the operation direction is not parallel to the vibration damping direction. Such an actuator generally has the largest size to the operation direction. Therefore, such a vibration reducing apparatus can be formed to have the smaller size in the vibration damping direction than another vibration damping unit in which the operation direction and the vibration damping direction are same, and is more compactly formed.

The elastic member and the control mass are arranged such that an elastic member segment as an orthographic projection of the elastic member onto a straight line parallel to the vibration damping direction overlaps with a control mass segment as an orthographic projection of the control mass to the straight line. Such a vibration reducing apparatus can be formed to have the smaller size in the vibration damping direction than another vibration damping unit in which the control mass and the elastic member are arranged such that the elastic member segment does not overlap with the control mass segment, and is more compactly formed.

The vibration reducing apparatus of the present invention more includes a housing which is fixed on the vibration damping object. The housing includes an upper side member and a lower side member which opposes to the upper side member. The dynamic mass is arranged between the upper side member and the lower side member. The elastic member includes an upper side elastic member arranged between the upper side member and the dynamic mass, and a lower side elastic member arranged between the lower side member and the dynamic mass. An upper side elastic member junction portion to which the upper side elastic member of the dynamic mass is coupled is arranged to be nearer the lower side member than a lower side elastic member junction portion to which the lower side elastic member of the dynamic mass is coupled. Such a vibration reducing apparatus can be formed to have the smaller size in the vibration damping direction than another vibration damping unit that the upper side elastic member joint is arranged near the upper side member than the lower side elastic member joint portion, and is more compactly formed.

The vibration reducing apparatus of the present invention further includes another control mass, another actuator and another motion direction converting mechanism configured to move the control mass to the dynamic mass such that the other actuator operates to move the other control mass to the vibration damping direction to the dynamic mass. That is, the vibration reducing apparatus includes a plurality of control masses and a plurality of actuators for moving the plurality of control masses. In such a vibration reducing apparatus, by arranging the plurality of control masses symmetrically with respect to one straight line parallel to the vibration damping direction, the plurality of control masses can be moved such that the center of gravity of the plurality of control masses moves in parallel to the vibration damping direction. Therefore, such a vibration reducing apparatus can vibrate the center of gravity of the dynamic masses along the vibration damping direction in a higher precision than another vibration damping unit which includes only one the control mass and can carry out the vibration damping of the vibration damping object in a higher precision.

The helicopter of the present invention includes a vibration reducing apparatus of the present invention and a helicopter main body which includes a vibration damping object. In such a helicopter the vibration which is propagated or transferred to a passenger can be more reduced. That is, it is desirable that the vibration reducing apparatus of the present invention is applied to the vibration damping object of the helicopter.

The helicopter manufacturing method of the present invention includes preparing a vibration reducing apparatus of the present invention and installing the vibration reducing apparatus to the helicopter main body having a vibration damping object. According to such a helicopter manufacturing method, by remodeling the existing helicopter, the helicopter that the vibration which is propagated or transferred to the passenger is suppressed can be more easily made.

A vibration reducing apparatus of the present invention is more compactly formed.

DESCRIPTION OF EMBODIMENTS

Figure 1:
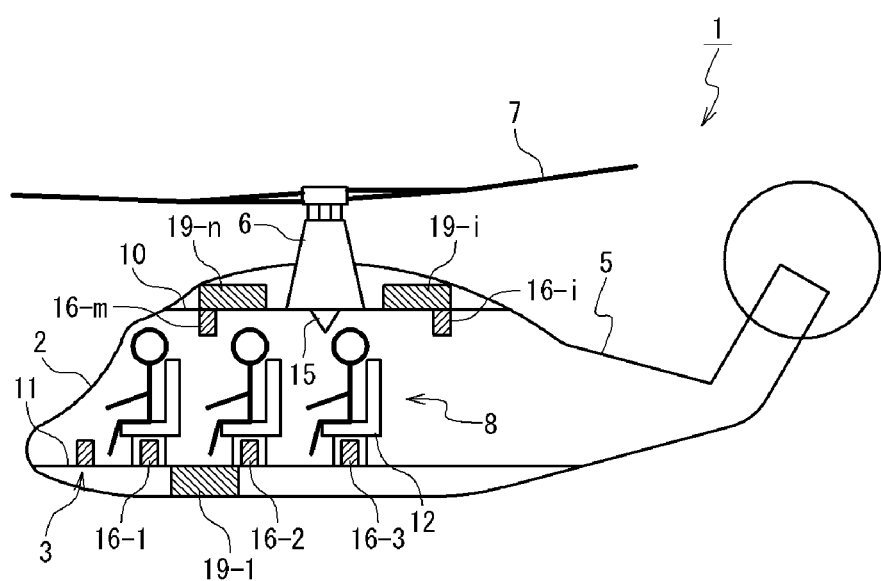
FIG. 1 is a diagram showing a helicopter of the present invention.

A helicopter according to embodiments of the present invention will be described with reference to the attached drawings. As shown in FIG. 1, the vibration reducing apparatus 3 is provided for a main body 2 of the helicopter 1. The helicopter main body 2 includes a main structure 5, a transmission 6, main rotor 7 and a cabin 8. The main structure 5 is formed from frames and beams and forms a skeleton of the helicopter main body 2. The transmission 6 rotatably supports the main rotor 7 to the main structure 5. Moreover, the transmission 6 transfers the rotation power to the main rotor 7 from a rotation power source (not shown) such that the main rotor 7 rotates in the predetermined number of rotations with respect to the main structure 5. The main rotor 7 includes a plurality of blades. Each of the plurality of wings generates lift force when the main rotor 7 rotates with respect to the main structure 5. That is, the main rotor 7 generates the thrust power of the helicopter through the rotation to the main structure 5.

The cabin 8 is formed in a box shape and includes a cabin ceiling 10, an underfloor structure 11, and a plurality of seats 12. The cabin ceiling 10 is arranged in a top section of the cabin 8 and is supported by the main structure 5. The underfloor structure 11 is arranged in a lower section of the cabin 8 and is supported by the main structure 5. The plurality of seats 12 are fixed on the underfloor structure 11 and are used for passengers of the helicopter.

The helicopter main body 2 moves in an upper or lower direction and in a forward or backward direction and hovers in the air, by operating a flight controller arranged in the cockpit by the passenger. An N/Rev vibration is caused when the main rotor 7 rotates in the predetermined number of rotations to the main structure 5 while the helicopter main body 2 is sailing the air. The N/Rev vibration is propagated to the main structure 5 through the transmission 6, from the main structure 5 to the cabin 8, and then to the passengers through plurality of seats 12 in the cabin 8. The frequency of the N/Rev vibration changes if the helicopter main body 2 receives wind and if the number of rotations of the main rotor 7 changes when the helicopter main body 2 turns over suddenly.

Figure 2:
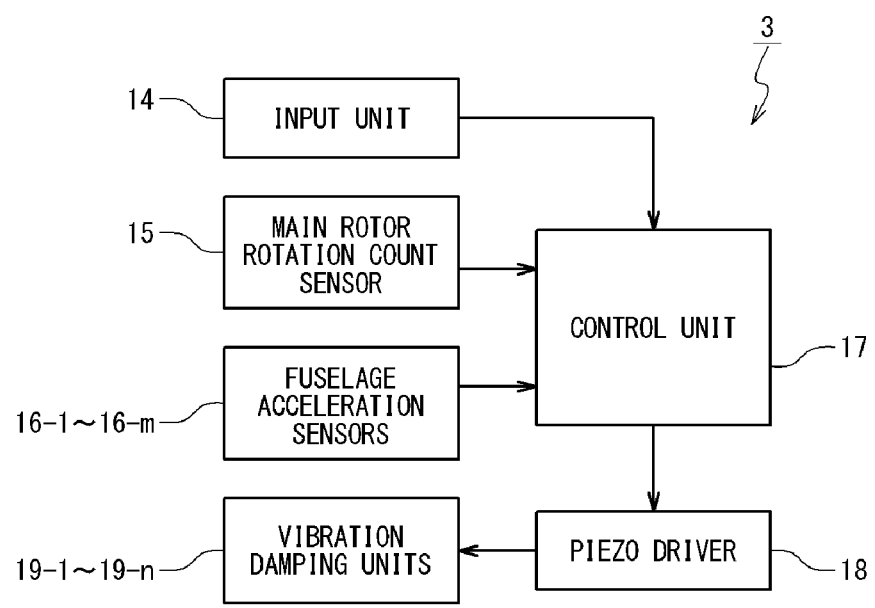
FIG. 2 is a block diagram showing a vibration reducing apparatus to which a vibration reducing apparatus of the present invention is applied.

FIG. 2 shows the vibration reducing apparatus 3. The vibration reducing apparatus 3 includes an input unit 14, a main rotor rotation count sensor 15, a plurality of fuselage acceleration sensors 16-1 to 16-$m$ (m=2, 3, 4, . . . ), a control unit 17, a piezo driver 18 and a plurality of vibration damping units 19-1 to 19-$n$ (n=2, 3, 4, . . . ).

The input unit 14 is disposed in the cockpit, is operated by the passenger to generate data, and outputs the data to the control unit 17. For example, the input unit 14 selects one of the modes of control ON and control OFF in response to an operation by the passenger, and outputs the selected mode to the control unit 17.

The main rotor rotation count sensor 15 measures the number of rotations per a unit time (rotation count) of the main rotor 7 to the main structure 5 under a control by the control unit 17 and transmits the rotation count to the control unit 17.

The piezo driver 18 is electrically connected with the plurality of vibration damping units 19-1 to 19-$n$ through a plurality of signal lines so as to be transmittable a plurality of electric signals to the plurality of vibration damping units 19-1 to 19-$n$. The piezo driver 18 outputs a predetermined number of electric signals to the plurality of vibration damping units 19-1 to 19-$n$ through the signal lines under the control by the control unit 17.

The plurality of vibration damping units 19-1 to 19-$n$ are fixed on different positions of the cabin ceiling 10 and the underfloor structure 11.

The plurality of fuselage acceleration sensors 16-1 to 16-$m$ are fixed on positions of the underfloor structure 11 where the plurality of seats 12 are disposed, and fixed to positions of the cabin ceiling 10 or the underfloor structure 11 where the plurality of vibration damping units 19-1 to 19-$n$ are fixed. The plurality of fuselage acceleration sensors 16-1 to 16-$m$ measure the accelerations on the positions where the fuselage acceleration sensors are fixed and transmit the measured accelerations to the control unit 17.

Figure 3:
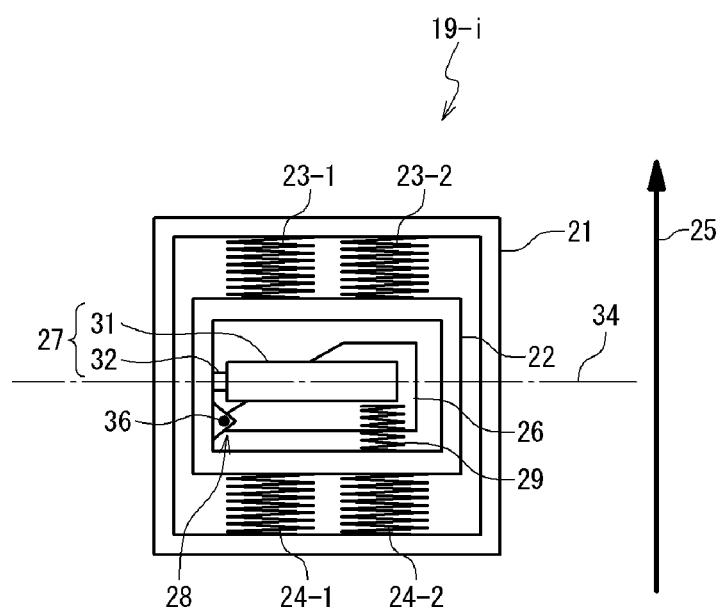
FIG. 3 is a sectional view showing a vibration damping unit.

FIG. 3 shows an optional vibration damping unit 19-$i$ ($i$=1, 2, 3, ..., n) of the plurality of vibration damping units 19-1 to 19-$n$. The vibration damping unit 19-$i$ includes a housing 21, a dynamic mass 22, a plurality of upper side springs 23-1 to 23-2 and a plurality of lower side springs 24-1 to 24-2.

The housing 21 is formed in a box-shape. The housing 21 is fixed on the cabin ceiling 10 or the underfloor structure 11. The dynamic mass 22 is arranged inside the housing 21. The mass of 20 kg is exemplified as the dynamic mass 22. The dynamic mass 22 is supported by the housing 21 to be movable in parallel to side walls of the housing 21. Each of the plurality of upper side springs 23-1 to 23-2 and the plurality of lower side springs 24-1 to 24-2 is formed of an elastic material. Each of the plurality of upper side springs 23-1 to 23-2 and the plurality of lower side springs 24-1 to 24-2 is connected with the housing 21 and the dynamic mass 22, and applies elastic force to the dynamic mass 22 with respect to the housing 21 such that the dynamic mass 22 can vibrate in parallel to the vibration damping direction 25 to the housing 21.

Moreover, the vibration damping unit 19-$i$ includes a control mass 26, a piezo actuator 27, a motion direction converting mechanism 28 and a spring 29.

The control mass 26 is formed of a material having a mass of about 40% of the mass of the dynamic mass 22. The piezo actuator 27 includes a casing 31 and a movable portion 32, and has a piezo device (not shown). The casing 31 is formed in a container-shape and is fixed on the control mass 26. The movable portion 32 is supported by the casing 31 to be movable in the parallel to an operation direction 34 of the piezo actuator 27 as a direction of elongation and contraction of the piezo actuator 27. In the piezo actuator 27, the casing 31 is fixed to the control mass 26 such that the operation direction 34 is orthogonal to the vibration damping direction 25. The piezo device moves the movable portion 32 in parallel to the operation direction 34 with respect to the casing 31 in response to an electric signal supplied from the piezo driver 18.

The motion direction converting mechanism 28 supports the control mass 26 with respect to the dynamic mass 22 such that the control mass 26 can rotate around a rotation axis 36. The rotation axis 36 is fixed to the dynamic mass 22 and is orthogonal to the vibration damping direction 25.

The spring 29 is formed of an elastic material. One end of the spring 29 is connected with the dynamic mass 22 and the other end thereof is connected with the control mass 26. The spring 29 applies elastic force to the control mass 26 such that the piezo actuator 27 contracts into the operation direction 34.

At this time, the piezo actuator 27 is controlled by the control unit 17 to rotate the control mass 26 around the rotation axis 36 with respect to the dynamic mass 22 such that the center of gravity of the control mass 26 moves in substantially parallel to the vibration damping direction 25.

At this time, the elastic force of the plurality of upper side springs 23-1 to 23-2 and the plurality of lower side springs 24-1 to 24-2 is designed such that the vibration frequency of the dynamic mass 22 becomes equal to the frequency of the N/rev vibration, when the control mass 26 is fixed to the dynamic mass 22. The N/rev vibration is a vibration caused when the main rotor 7 rotates. That is, the frequency of the N/rev vibration coincides with a product of the number of rotations of the main rotor 7 and the number of blades of the main rotor 7.

Figure 4:
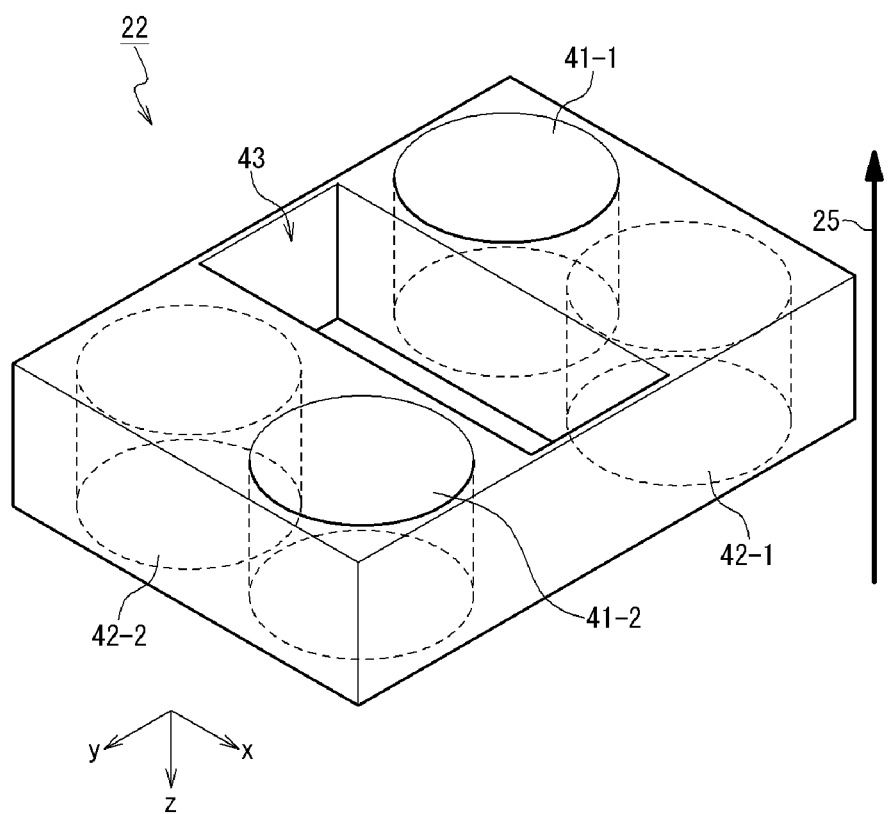
FIG. 4 is a perspective view showing a dynamic mass.

FIG. 4 shows the dynamic mass 22. The dynamic mass 22 is formed to have a rectangular parallelepiped shape and counterbores 41-1 and 41-2 for the plurality of upper side springs, counterbores 42-1 and 42-2 for the plurality of lower side springs and an opening 43 for the control mass are formed. The counterbores 41-1 and 41-2 for the plurality of upper side springs are formed in one plane of the rectangular parallelepiped shape and correspond to the plurality of upper side springs 23-1 and 23-2. The counterbores 42-1 and 42-2 for the plurality of lower side springs are formed in one plane opposite to the plane where counterbores 41-1 and 41-2 for the plurality of upper side springs of the rectangular parallelepiped shape are formed and correspond to the plurality of lower side springs 24-1 to 24-2.

The opening 43 for the control mass is formed in the plane of the rectangular parallelepiped shape where the counterbores 41-1 and 41-2 for the plurality of upper side springs are formed. The opening 43 for the control mass is formed to be disposed between the counterbore 41-1 for the upper side spring and the counterbore 41-2 for the upper side spring, and to be disposed between the counterbore 42-1 for the lower side spring and the counterbore 42-2 for the lower side spring.

The dynamic mass 22 is formed to pass the center of gravity of the dynamic mass 22 and to be dyad symmetry with respect to a straight line parallel to the vibration damping direction 25. That is, the counterbores 41-1 and 41-2 for the plurality of upper side springs are formed such that a segment which links the center of counterbore 41-1 for the upper side spring and the center of counterbore 41-2 for the upper side spring intersects with the straight line. The counterbores 42-1 and 42-2 for the plurality of lower side springs are formed such that a segment which links the center of the counterbore 42-1 for the lower side spring and the center of the counterbore 42-2 for the lower side spring intersects with the straight line.

Figure 5:
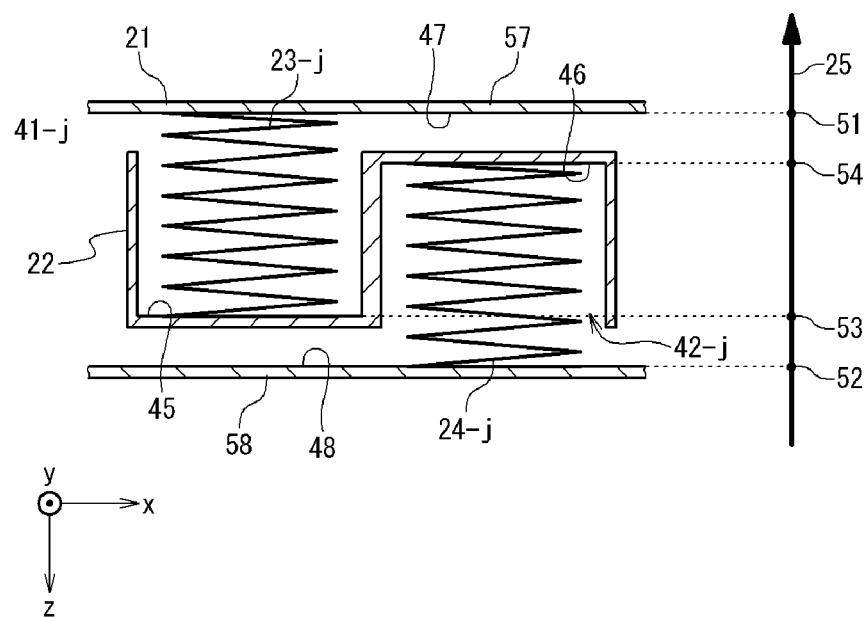
FIG. 5 is a sectional view showing the dynamic mass.

A base plane 45 of the dynamic mass 22 is formed to the counterbore 41-$j$ ($j$=1, 2) for the upper side spring of the counterbores 41-1 and 41-2 for the plurality of upper side springs, as shown in FIG. 5. The base plane 45 is formed to be along a plane orthogonal to the vibration damping direction 25 as the bottom of the counterbore 41-$j$ for the upper side spring. Moreover, the base plane 46 of the dynamic mass 22 is formed to the counterbore 42-$j$ for the lower side spring of the counterbores 42-1 to 42-2 for the plurality of lower side springs. The base plane 46 is formed to be along a plane orthogonal to the vibration damping direction 25 as the bottom of the counterbore 42-$j$ for the lower side spring.

The housing 21 includes an upper side member 57 and a lower side member 58. The upper side member 57 has an upper side inner wall surface 47 and the lower side member 58 has a lower side inner wall surface 48. The upper side inner wall surface 47 is formed to be along a plane orthogonal to the vibration damping direction 25 and is formed to face inside the container which the housing 21 forms. The lower side inner wall surface 48 is formed to be along a plane orthogonal to the vibration damping direction 25 and is formed as an inner wall of the container of the housing 21 which opposes to the upper side inner wall surface 47. At this time, the dynamic mass 22 is arranged between the upper side inner wall surface 47 and the lower side inner wall surface 48.

The upper side spring 23-$j$ corresponding to the counterbore 41-$j$ for the upper side spring of the plurality of upper side springs 23-1 to 23-2 is arranged inside the counterbore 41-$j$ for the upper side spring. Moreover, the upper side spring 23-$j$ is arranged between the base plane 45 and the upper side inner wall surface 47, and one end thereof is coupled to the base plane 45 and the other end thereof is coupled to the upper side inner wall surface 47.

The lower side spring 24-*j* corresponding to the counterbore 42-*j* for the lower side spring of the plurality of lower side springs 24-1 to 24-2 is arranged inside the counterbore 42-*j* for the lower side spring. Moreover, the lower side spring 24-*j* is arranged between the base plane 46 and the lower side inner wall surface 48, and one end thereof is coupled with the base plate 46 and the end thereof is coupled with the lower side inner wall surface 48.

At this time, the upper side inner wall surface 47 and the lower side inner wall surface 48 are formed so that a point 51 when the upper side inner wall surface 47 is orthographic projected on the straight line which is parallel to the vibration damping direction 25 and a point 52 when the lower side inner wall surface 48 is orthographic projected on the straight line do not overlap. The base plane 45 of the counterbore 41-*j* for the upper side spring is formed so that a point 53 when the base plane 45 is orthographic projected on the straight line is arranged between the point 51 and the point 52. The base plane 46 of the counterbore 42-*j* for the lower side spring is formed so that a point 54 when the base plate 46 is orthographic projected on the straight line is arranged between the point 51 and the point 52. Moreover, the dynamic mass 22 is formed such that a point 53 is nearer the point 52 than a point 54. That is, the upper side spring 23-*j* and the lower side spring 24-*j* are arranged such that a part of a segment when the upper side spring 23-*j* is orthographic projected on the straight line overlaps with a part of a segment when the lower side spring 24-*j* is orthographic projected on the straight line.

Figure 6:
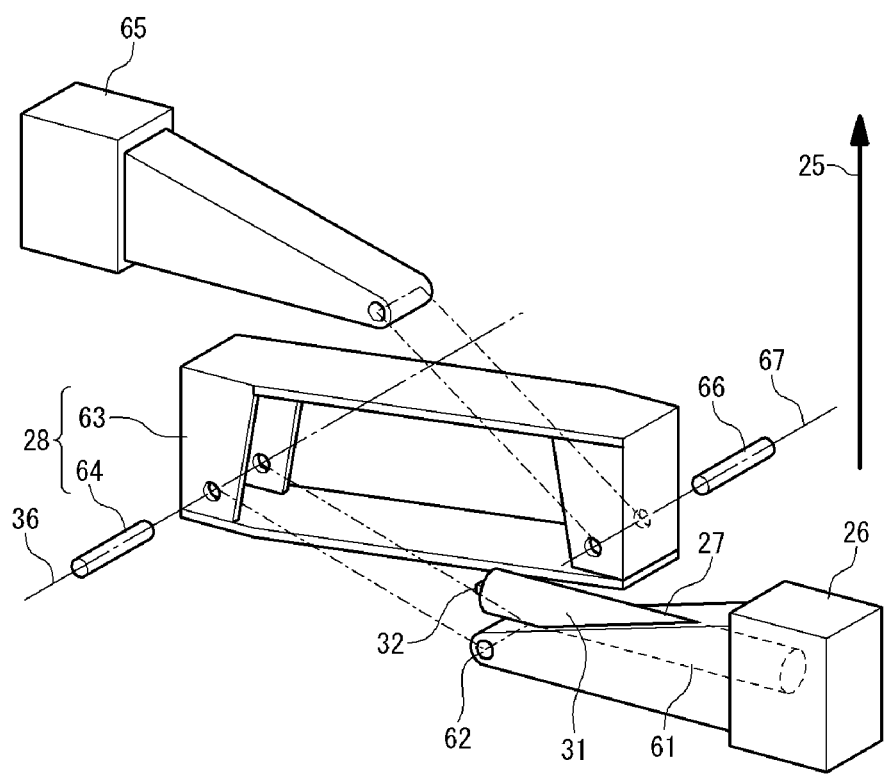
FIG. 6 is a perspective view showing a motion direction converting mechanism.

FIG. 6 shows the control mass 26. An actuator hole 61 and a pin hole 62 are formed in the control mass 26. The actuator hole 61 is formed to be possible to insert the casing 31 of the piezo actuator 27. The pin hole 62 is formed to be away by a predetermined distance from the center of gravity of the control mass 26. Moreover, the pin hole 62 is formed so that the pin hole 62 does not overlap with a region extended in the operation direction 34 of the piezo actuator 27 when the casing 31 of the piezo actuator 27 is inserted in the actuator hole 61.

The motion direction converting mechanism 28 includes a member 63 and a pin 64. The member 63 is arranged inside a control mass opening 43 of the dynamic mass 22 and is fixed to the dynamic mass 22. The pin 64 is formed to have a stick-shape and is arranged around the rotation axis 36. The pin 64 is inserted in the pin hole 62 of the control mass 26 which is fixed to the member 63, so that the control mass 26 is supported by the member 63 to be rotatable around the rotation axis 36.

The casing 31 of the piezo actuator 27 is inserted in the actuator hole 61 of the control mass 26 so as to fix the casing 31 on the control mass 26. Moreover, the movable portion 32 of the piezo actuator 27 is arranged to be contact with a part of the member 63. The movable portion 32 of the piezo actuator 27 moves to the casing 31 so that the control mass 26 turns around the rotation axis 36. The control mass 26 turns around the rotation axis 36, so that the center of gravity of the control mass 26 moves in almost parallel to the vibration damping direction 25.

The motion direction converting mechanism 28 is formed such that a distance from the pin hole 62 to the center of gravity of the control mass 26 is greater than a distance from the pin hole 62 to the movable portion 32 of the piezo actuator 27. According to such a motion direction converting mechanism 28, when the movable portion 32 of the piezo actuator 27 moves by a given distance toward the casing 31 in the operation direction 34, the center of gravity of the control mass 26 can move in the vibration damping direction 25 by a distance which is greater than the above distance.

Moreover, the vibration damping unit 19-*i* includes another control mass 65 and another piezo actuator (not shown). At this time, the motion direction converting mechanism 28 further includes a pin 66. The piezo actuator includes a casing and a movable portion, like the piezo actuator 27. The piezo actuator moves the movable portion to the casing in parallel to the operation direction in response to an electric signal supplied from the piezo driver 18.

The control mass 65 is formed symmetrically with the control mass 26, i.e. an actuator hole and a pin hole are formed like the control mass 26. The actuator hole is formed such that the casing of the piezo actuator can be inserted. Moreover, the motion direction converting mechanism 28 further includes a pin 66. The pin 66 is formed to have a stick-shape and is arranged along a rotation axis 67. The rotation axis 67 is fixed on a member 63. The rotation axis 67 is formed so that the rotation axis 67 and the rotation axis 36 are in the relation of dyad symmetry with respect to a straight line which passes through the center of gravity of the dynamic mass 22 and is in parallel to the vibration damping direction 25.

The pin 66 is inserted in the pin hole of the control mass 65 and is fixed on it, and the control mass 65 supports the member 63 rotatably around the rotation axis 67.

The casing of the piezo actuator is inserted in the actuator hole of the control mass 65 so that the casing is fixed on the control mass 65. The movable portion of the piezo actuator is arranged to be contact with a part of the member 63. That is, the movable portion of the piezo actuator moves with respect to the casing so that the control mass 65 rotates around the rotation axis 67. When the control mass 65 rotates around the rotation axis 67, the center of gravity of the control mass 65 moves in almost parallel to the vibration damping direction 25.

At this time, the piezo actuator 27 and the piezo actuator synchronously rotate the control mass 26 and the control mass 65, so that the center of gravity of the control mass 26 and the center of gravity of the control mass 65 move in almost parallel to the vibration damping direction 25.

When the control mass 26 moves to the dynamic mass 22, force of parallel movement to the housing 21 is applied to the dynamic mass 22 due to the reaction of the control mass 26. Therefore, by appropriately moving the control mass 26 to the dynamic mass 22, the dynamic mass 22 vibrates at a frequency different from a vibration frequency when the control mass 26 is fixed to the dynamic mass 22. A degree of the change of the frequency is 3% as an example. By appropriately moving the control mass 26 to the dynamic mass 22, the dynamic mass 22 vibrates at an amplitude which is different from a vibration amplitude of the dynamic mass 22 when the control mass 26 is fixed to the dynamic mass 22.

The piezo actuator 27 generally has the greatest size in the operation direction 34. Here, the size value shows the size of the piezo actuator 27, and is either of the length, the thickness, or the width of the piezo actuator 27. Therefore, the vibration damping unit 19-*i* can be formed to be smaller in the size of vibration damping direction 25, compared with the vibration damping unit in which the operation direction 34 and the vibration damping direction 25 are parallel, and the vibration damping unit 19-*i* can be more compactly formed.

The vibration damping unit 19-*i* is formed such that the orthographic projection of the control mass 26 and the control mass 65 on a projection plane which is orthogonal to the vibration damping direction 25 does not overlap with the orthographic projection of the upper side spring 23-*j* onto the projection plane. Therefore, the vibration damping unit 19-*i* can be formed such that a part of a segment of the orthographic projection of the upper side spring 23-*j* on a straight line parallel to the vibration damping direction 25 overlaps with a part of a segment of the orthographic projection of the control mass 26 and the control mass 65 on the straight line. At this time, the vibration damping unit 19-$i$ can be formed to be smaller and more compact in the size of vibration damping direction 25, compared with a vibration damping unit in which the segment of the orthographic projection of the upper side spring 23-$j$ on the straight line overlaps with the segment of the orthographic projection of the control mass 26 on the straight line.

Moreover, the vibration damping unit 19-$i$ is formed such that the orthographic projection of the upper side spring 23-$j$ on the projection plane which is orthogonal to the vibration damping direction 25 does not overlap with the orthographic projection of the lower side spring 24-$j$ on the projection plane. Therefore, the vibration damping unit 19-$i$ can be formed such that a part of a segment of the orthographic projection of the upper side spring 23-$j$ on a straight line parallel to the vibration damping direction 25 overlaps with a part of the segment of the orthographic projection of the lower side spring 24-$j$ on the straight line. At this time, the vibration damping unit 19-$i$ can be formed to be smaller and more compact in the size of vibration damping direction 25, compared with the vibration damping unit in which the orthographic projection of the upper side spring 23-$j$ on the projection plane overlaps with the orthographic projection of the lower side spring 24-$j$ on the projection plane.

Note that in the vibration reducing apparatus of the present invention, the upper side spring 23-$j$ or the lower side spring 24-$j$ and the control mass 26 can be arranged in the vibration damping direction 25. Such a vibration reducing apparatus can be formed to be smaller and more compact in the size of vibration damping direction 25, compared with the vibration damping unit in which the upper side spring 23-$j$, the lower side spring 24-$j$ and the control mass 26 are arranged to be arranged in the vibration damping direction 25.

Note that the vibration reducing apparatus of the present invention may be formed such that the orthographic projection of the control mass 26 and the control mass 65 on a projection plane which is orthogonal to the vibration damping direction 25 overlaps the orthographic projection of the upper side spring 23-$j$ on the projection plane; or the orthographic projection of the control mass 26 and the control mass 65 on the projection plane is different in position from the orthographic projection of the lower side spring 24-$j$ on the projection plane, or the upper side spring 23-$j$ and the lower side spring 24-$j$ are arranged in the vibration damping direction 25. By forming so that the operation direction 34 and the vibration damping direction 25 are not parallel to each other, such a vibration damping unit can be formed to be smaller and more compact in the size of vibration damping direction 25, compared with a vibration damping unit in which the operation direction 34 and the vibration damping direction 25 are parallel to each other.

Figure 7:
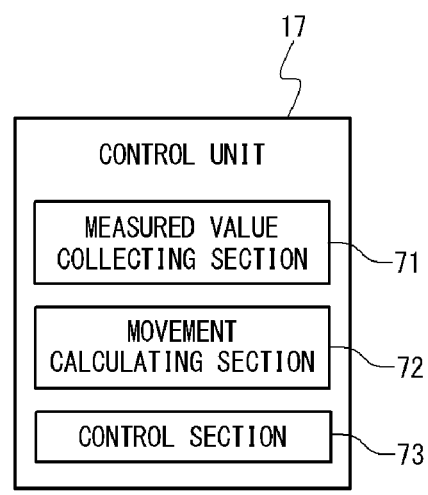
FIG. 7 is a block diagram showing a control unit.

FIG. 7 shows the control unit 17. The control unit 17 is a computer and includes a CPU, a storage unit, a removable memory drive, a communication unit and an interface (which are not shown). The CPU executes a computer program which is installed in the control unit 17 and controls the storage unit and the interface. The storage unit records the computer program and temporarily records data which is generated by the CPU. The removable memory drive is used to read data recorded in a recording medium when the recording medium is inserted thereinto. Moreover, the removable memory drive is used when installing the computer program in the control unit 17 when the recording medium storing the computer program is inserted. As the recording medium, a flash memory, a magnetic disk (a flexible disk, a hard disk), an optical disk (CD, DVD), a magneto-optic disc are exemplified. The communication unit transmits data generated by the CPU through a communication network to another computer and outputs data received from another computer through the communication network to the CPU. Moreover, the communication unit is used to download the computer program to be installed into the computer, from another computer. The interface outputs the data which is generated by an external unit connected with the control unit 17 to the CPU and outputs the data generated by the CPU to the external unit. The external unit contains an input unit 14, the main rotor rotation count sensors 15, the plurality of fuselage acceleration sensors 16-1 to 16-$m$ and the piezo driver 18.

The computer program installed in the control unit 17 is formed from a plurality of computer programs so as to achieve a plurality of functions by the control unit 17. The plurality of functions contains a measured value collecting section 71, a movement calculating section 72 and a control section 73.

The measured value collecting section 71 controls the plurality of fuselage acceleration sensors 16-1 to 16-$m$ such that the plurality of fuselage acceleration sensors 16-1 to 16-$m$ in the cabin 8 measure the plurality of accelerations corresponding to a plurality of positions where the plurality of fuselage acceleration sensors 16-1 to 16-$m$ are fixed. One acceleration corresponding to one position among the plurality of accelerations shows an acceleration when the one position moves. Moreover, the measured value collecting section 71 controls the main rotor rotation count sensor 15 to measure the number of rotations of the main rotor 7 to the main structure 5 per a unit time.

The movement calculating section 72 calculates a plurality of inertia forces corresponding to the plurality of vibration damping units 19-1 to 19-$n$ based on the measurement values collected by the measured value collecting section 71. The inertia force corresponding to the vibration damping unit 19-$i$ among the plurality of inertia forces is calculated such that the vibration of the cabin 8 can be reduced when the control mass 26 and the dynamic mass 22 in the vibration damping unit 19-$i$ apply the inertia forces to the housing 21. Moreover, the movement calculating section 72 calculates a plurality of control mass movements based on the plurality of calculated inertia forces. The plurality of control mass movements corresponds to the plurality of vibration damping units 19-1 to 19-$n$. The control mass movement corresponding to the vibration damping unit 19-$i$ among the plurality of control mass movements shows the movement of the control mass 26 to the dynamic mass 22 of the vibration damping unit 19-$i$. The control mass movement is calculated such that the dynamic mass 22 and the control mass 26 apply the calculated inertia forces to the housing 21.

The control unit 73 controls the plurality of vibration damping units 19-1 to 19-$n$ based on the plurality of control mass movements such that the control mass 26 of the vibration damping unit 19-$i$ carries out the control mass movement corresponding to the vibration damping unit 19-$i$ among the plurality of control mass movements calculated by the movement calculating section 72. That is, the control unit 73 controls the piezo driver 18 such that a plurality of electric signals are respectively supplied to the piezo actuators 27 of the plurality of vibration damping units 19-1 to 19-$n$. Each of the plurality of electric signals is generated for the control mass 26 of the vibration damping unit 19-$i$ to execute the control mass movement corresponding to vibration damping unit 19-$i$ among the plurality of control mass movements.

The vibration reducing method executed by the vibration reducing apparatus 3 is used to reduce the vibration which occurs in the helicopter 1. The control unit 17 controls the main rotor rotation count sensor 15 to measure the number of rotations of the main rotor 7 to the main structure 5 per a unit time. By controlling the plurality of fuselage acceleration sensors 16-1 to 16-$m$ by the control unit 17, the plurality of fuselage acceleration sensors 16-1 to 16-$m$ in the cabin 8 measures the plurality of accelerations corresponding to the plurality of fixed positions, respectively. The acceleration of the plurality of accelerations which corresponds to one position shows the acceleration of the movement of the part.

The control unit 17 calculates the plurality of dynamic mass movements corresponding to the plurality of vibration damping units 19-1 to 19-$n$ based on the collected measurement values. The dynamic mass movement of the plurality of dynamic mass movements which corresponds to the vibration damping unit 19-$i$ is executed by the dynamic mass 22 of the vibration damping unit 19-$i$, and calculated such that the vibration of the cabin 8 can be reduced. Moreover, the control unit 17 calculates the plurality of control mass movements which correspond to the plurality of vibration damping units 19-1 to 19-$n$ based on the plurality of calculated dynamic mass movements. The control mass movement corresponding to the vibration damping unit 19-$i$ among the control mass movements corresponding to the plurality of vibration damping units 19-1 to 19-$n$ shows the movement in which the control mass 26 moves for the dynamic mass 22 of the vibration damping unit 19-$i$, and is calculated for the dynamic mass 22 to execute the calculated dynamic mass movement by being executed by the control mass 26.

The control unit 17 controls the input unit 14 to detect whether the control OFF or the control ON is selected by the passenger. When the control OFF is selected, the control unit 17 fixes the control mass 26 on the dynamic mass 22 by controlling the piezo driver 18.

When the control ON is selected, the control unit 17 moves the control mass 26 by controlling the plurality of vibration damping units 19-1 to 19-$n$. That is, the control unit 17 controls the piezo drivers 18 to supply a plurality of electric signals to the piezo actuators 27 of the plurality of vibration damping units 19-1 to 19-$n$, respectively. Each of the plurality of electric signals is generated for the control mass 26 of the vibration damping unit 19-$i$ to execute the control mass movement corresponding to the vibration damping unit 19-$i$ among the plurality of the control mass movements.

When the electric signal is applied from the piezo driver 18, the piezo actuator 27 of the vibration damping unit 19-$i$ moves the control mass 26 in parallel to the dynamic mass 22 such that the control mass 26 executes the calculated control mass movement. By the inertia force generated by the movement of the control mass 26, the dynamic mass 22 moves to the housing 21. The vibration reduces at the position at which the vibration damping unit 19-$i$ is fixed in the cabin 8 due to the inertia force generated through the movement of the dynamic mass 22.

The number of rotations of the main rotor 7 changes due to a wind which the main rotor blades receive. According to such a vibration reducing apparatus, it is possible for the dynamic mass 22 to vibrate the control mass 26 at various frequencies by moving it appropriately to the dynamic mass 22. According to such a vibration reducing apparatus, by moving the control mass 26 appropriately to the dynamic mass 22, even when the number of rotations (rotation count) of the main rotor 7 changes so that the frequency of the vibration of the cabin 8 is changed, the vibration of the cabin 8 can be more surely reduced.

Even when the control unit 17 does not function due to a failure, that is, even when the control mass 26 is fixed to the dynamic mass 22, the dynamic mass 22 can vibrate in a predetermined frequency in such a vibration reducing apparatus. As a result, such a vibration reducing apparatus can reduce the vibration more surely when it does not function correctly due to the failure.

Such a vibration reducing apparatus can move the center of gravity of the control mass 26 and the control mass 65 into the vibration damping direction 25 in a high precision, by the piezo actuator 27 and the piezo actuator of the control mass 65 synchronously rotating and moving the control mass 26 and the control mass 65. Therefore, such a vibration reducing apparatus can reduce the vibration more precisely, compared with another vibration reducing apparatus which includes only one control mass 65. Note that in the vibration damping unit 19-$i$, the control mass 65 can be omitted so as to have only one control mass 26, when the movement of the center of gravity of the control mass 26 is parallel to the vibration damping direction 25 sufficiently. The vibration can be more surely reduced in the vibration reducing apparatus which includes only one control mass 26, and the apparatus can be compactly formed, like the vibration reducing apparatus in the above embodiments.

The helicopter manufacturing method according to the embodiments of the present invention includes an operation of preparing a helicopter main body 2, an operation of preparing the vibration reducing apparatus 3 and an operation of installing the vibration reducing apparatus 3 into the helicopter main body 2. According to such a helicopter manufacturing method, a helicopter which can reduce vibration more appropriately can be manufactured by remodeling the existing helicopter.

Note that the helicopter may be installed with only one vibration damping unit 19-$i$ when the vibration transferred to the passenger can be sufficiently reduced.

Such a vibration reducing apparatus can be used to reduce the vibration of equipments except the helicopter. As such equipment, a car and a washer are exemplified.

Note that the piezo actuator 27 may be replaced by another actuator to move the control mass 26. As the actuator, an actuator is exemplified which includes a super-magnetostriction device which can be transformed based on the applied magnetic field. The vibration reducing apparatus to which such an actuator is applied can reduce vibration more surely, like the vibration reducing apparatus of the above embodiments.

Note that when the movement of the control mass 26 can be calculated based on only the accelerations measured by the plurality of fuselage acceleration sensors 16-1 to 16-$m$ such that the vibration transferred to the passengers can be sufficiently reduced, the main rotor rotation count sensor 15 can be omitted in the vibration reducing apparatus 3.

Figure 8:
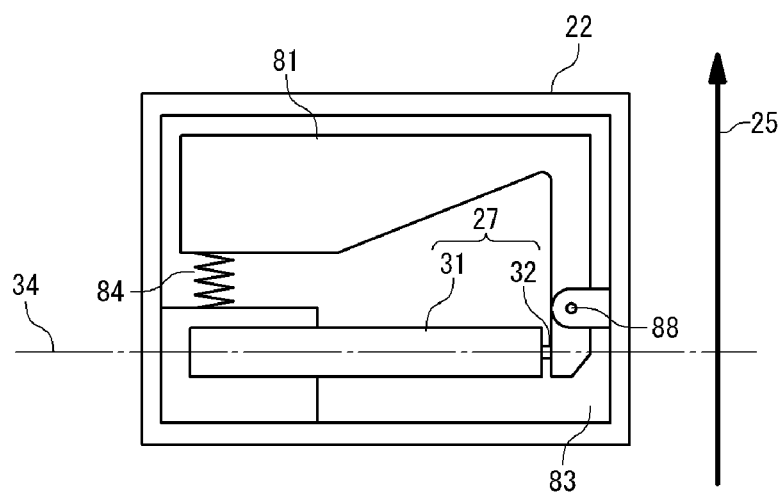
FIG. 8 is a side view showing another motion direction converting mechanism.

In the vibration reducing apparatus according to another embodiment of the present invention, the motion direction converting mechanism 28 in the above embodiments may be replaced by another motion direction converting mechanism. A control mass 81 is supported by the dynamic mass 22 in a motion direction converting mechanism 83 such that the control mass 81 can be rotated around a rotation axis 88 as shown in FIG. 8. At this time, the control mass 81 is formed such that the center of gravity of the control mass 81 is separated from the rotation axis 88 by a predetermined distance.

Moreover, in the motion direction converting mechanism 83, the casing 31 of the piezo actuator 27 is fixed on the dynamic mass 22 such that the operation direction 34 of the piezo actuator 27 is orthogonal to the vibration damping direction 25. At this time, the piezo actuator 27 is arranged such that the movable portion 32 pushes a part of the control mass 81 when the movable portion 32 of the piezo actuator 27 moves to the operation direction 34. The control mass 81 is formed such that the center of gravity of the control mass 81 moves in almost parallel to the vibration damping direction 25 when the movable portion 32 of the piezo actuator 27 moves to the operation direction 34. Moreover, the control mass 81 is formed such that a distance from the center of gravity of the control mass 81 to the rotation axis 88 is greater than a distance from a position pushed by the piezo actuator 27 of the control mass 81 to the rotation axis 88.

The vibration reducing apparatus further includes a spring 84. The spring 84 is formed of an elastic material like the spring 29 of the above embodiment, and applies elastic force to the control mass 81 such that the piezo actuator 27 is contracted into the operation direction 34.

The vibration damping unit to which the motion direction converting mechanism 83 is applied is different from the vibration damping unit 19-i of the above embodiments and the casing 31 of the piezo actuator 27 is fixed on the dynamic mass 22. In the vibration damping unit to which the motion direction converting mechanism 83 is applied, the piezo actuator 27 can be arranged so that the operation direction 34 of the piezo actuator 27 is not parallel to the vibration damping direction 25, like the vibration damping unit 19-i of the above embodiment, and the vibration damping unit is compactly formed.

Figure 9:
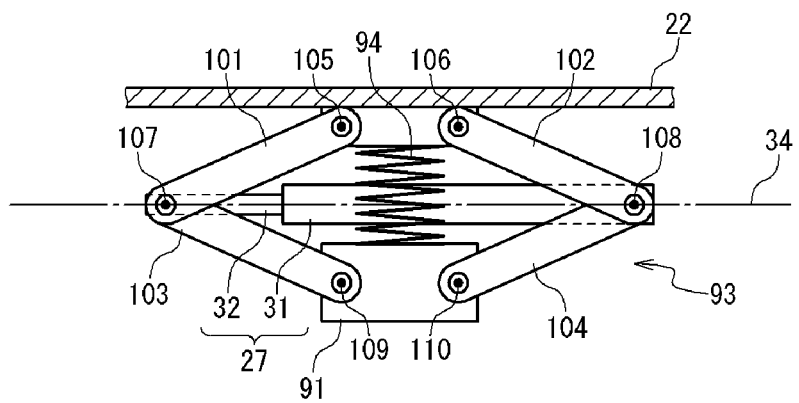
FIG. 9 is a side view showing another motion direction converting mechanism.

In the vibration reducing apparatus according to another embodiment of the present invention, the motion direction converting mechanism 28 in the above embodiments is replaced by another motion direction converting mechanism. The motion direction converting mechanism 83 is formed like a pantograph, as shown in FIG. 9. That is, the motion direction converting mechanism 93 includes a plurality of members 101 to 104. The member 101 is supported by the dynamic mass 22 to be rotatable around a rotation axis 105. The rotation axis 105 is fixed on the dynamic mass 22 and is orthogonal to the vibration damping direction 25. The member 102 is supported by the dynamic mass 22 to be rotatable around a rotation axis 106. The rotation axis 106 is fixed on the dynamic mass 22 and is parallel to the rotation axis 105. The rotation axis 106 is arranged such that an orthographic projection point of the rotation axis 106 on a straight line parallel to the vibration damping direction 25 coincides with an orthographic projection point of the rotation axis 105 on the straight line.

The member 103 is supported by the member 101 to be rotatable around a rotation axis 107. The rotation axis 107 is fixed on the member 101 and is parallel to the rotation axis 105. The member 104 is supported by the member 102 to be rotatable around a rotation axis 108. The rotation axis 108 is fixed on the member 102 and is parallel to the rotation axis 106. At this time, the member 102 is formed such that a distance from the rotation axis 106 to the rotation axis 108 is equal to a distance from the rotation axis 105 to the rotation axis 107.

A control mass 91 is supported by a member 103 to be rotatable around the rotation axis 109 and is supported by the member 104 to be rotatable around a rotation axis 110. The rotation axis 109 is fixed on the member 103 and is parallel to the rotation axis 107. The rotation axis 110 is fixed on the member 104 and is parallel to the rotation axis 108. At this time, the member 104 is formed such that a distance from the rotation axis 108 to the rotation axis 110 is equal to a distance from the rotation axis 107 to the rotation axis 109.

In the piezo actuator 27, a casing 31 is supported by the member 102 to be rotatable around the rotation axis 108, and the movable portion 32 is supported by the member 101 to be rotatable around rotation axis 107.

The motion direction converting mechanism 93 can move the control mass 91 to the vibration damping direction 25 by a distance which is longer than a predetermined distance, when the movable portion 32 of the piezo actuator 27 is moved by a predetermined distance in a direction parallel to the operation direction 34 to the casing 31.

In the vibration reducing apparatus to which the motion direction converting mechanism 93 is applied, the piezo actuator 27 can be arranged such that the operation direction 34 of the piezo actuator 27 is not parallel to the vibration damping direction 25, like the vibration damping unit 19-i of the above embodiments, and is compactly formed.

Note that the piezo actuator 27 may be replaced by another piezo actuator in which the casing is omitted. The piezo actuator includes a piezo device whose one end is supported by the control mass and whose other end is supported by the dynamic mass. The vibration reducing apparatus to which such a piezo device is applied is compactly formed like the vibration reducing apparatus of the above embodiments.

Note that this application claims a priority based on Japanese patent application (JP 2012-066872) which has been filed on Mar. 23, 2012. The disclosure thereof is incorporated herein by reference.

The invention claimed is:

1. A vibration reducing apparatus having a vibration damping unit which comprises:
   a dynamic mass;
   an elastic member configured to apply elastic force to said dynamic mass such that said dynamic mass vibrates in parallel to a vibration damping direction to a vibration damping object;
   a control mass;
   an actuator coupled to said dynamic mass at a first position of said dynamic mass, to drive said control mass by elongating and contracting in an operation direction of said actuator as a direction of elongation or contraction of said actuator; and
   a motion direction converting mechanism configured to couple said control mass to said dynamic mass at a second position of said dynamic mass which is different from the first position and to move said control mass to said dynamic mass into the vibration damping direction through elongation and contraction of said actuator,
   wherein said actuator is supported by said dynamic mass such that the operation direction of said actuator is not parallel to the vibration damping direction.

2. The vibration reducing apparatus according to claim 1, wherein said elastic member and said control mass are arranged such that an elastic member segment as an orthographic projection of said elastic member onto a straight line parallel to the vibration damping direction overlaps with a control mass segment as an orthographic projection of said control mass to the straight line.

3. The vibration reducing apparatus according to claim 1, wherein said vibration damping unit further comprises a housing which is fixed on the vibration damping object,
   wherein said housing comprises:
   an upper side member; and
   a lower side member disposed to oppose to said upper side member,
   wherein said dynamic mass is arranged between said upper side member and said lower side member,
   wherein said elastic member comprises:
   an upper side elastic member arranged between said upper side member and said dynamic mass; and
   a lower side elastic member arranged between said lower side member and said dynamic mass, and wherein an upper side elastic member junction portion to which said upper side elastic member of said dynamic mass is coupled is arranged to be nearer said lower side member than a lower side elastic member junction portion to which said lower side elastic member of said dynamic mass is coupled.

4. The vibration reducing apparatus according to claim 1, wherein said vibration damping unit further comprises:
   another control mass;
   another actuator coupled to said dynamic mass at a third position of said dynamic mass, to drive said another control mass by elongating and contracting in an operation direction of said another actuator; and
   another motion direction converting mechanism configured to couple said another control mass to said dynamic mass at a fourth position of said dynamic mass which is different from the first to third positions and to move said control mass to said dynamic mass through elongation and contraction of said another actuator.

5. The vibration reducing apparatus according to claim 1, wherein said actuator is coupled to said dynamic mass through said motion direction converting mechanism.

6. A helicopter comprising:
   a main rotor with blades;
   a helicopter main body having a vibration damping object and configured to rotate said main rotor; and
   a vibration reducing apparatus having a vibration damping unit provided to the vibration damping object and a control unit,
   wherein said vibration damping unit comprises:
   a dynamic mass;
   an elastic member configured to apply elastic force to said dynamic mass such that said dynamic mass vibrates in parallel to a vibration damping direction to the vibration damping object;
   a control mass;
   an actuator coupled to said dynamic mass at a first position of said dynamic mass, to drive said control mass by elongating and contracting in an operation direction of said actuator as a direction of elongation or contraction of said actuator; and
   a motion direction converting mechanism configured to couple said control mass to said dynamic mass at a second position of said dynamic mass which is different from the first position and to move said control mass to said dynamic mass into the vibration damping direction through elongation and contraction of said actuator,
   wherein said control unit is configured to drive said actuator based on a number of rotations of said main rotor of said helicopter and an acceleration of said helicopter main body, and
   wherein said actuator is supported by said dynamic mass such that the operation direction of said actuator is not parallel to the vibration damping direction.

7. The helicopter according to claim 6, wherein said elastic member and said control mass are arranged such that an elastic member segment as an orthographic projection of said elastic member onto a straight line parallel to the vibration damping direction overlaps with a control mass segment as an orthographic projection of said control mass to the straight line.

8. The helicopter according to claim 6, wherein said vibration damping unit further comprises a housing which is fixed on the vibration damping object,
   wherein said housing comprises:
   an upper side member; and
   a lower side member disposed to oppose to said upper side member,
   wherein said dynamic mass is arranged between said upper side member and said lower side member,
   wherein said elastic member comprises:
   an upper side elastic member arranged between said upper side member and said dynamic mass; and
   a lower side elastic member arranged between said lower side member and said dynamic mass, and
   wherein an upper side elastic member junction portion to which said upper side elastic member of said dynamic mass is coupled is arranged to be nearer said lower side member than a lower side elastic member junction portion to which said lower side elastic member of said dynamic mass is coupled.

9. The helicopter according to claim 6, wherein said vibration damping unit further comprises:
   another control mass;
   another actuator coupled to said dynamic mass at a third position of said dynamic mass, to drive said another control mass by elongating and contracting in an operation direction of said another actuator; and
   another motion direction converting mechanism configured to couple said another control mass to said dynamic mass at a fourth position of said dynamic mass which is different from the first to third positions and to move said control mass to said dynamic mass through elongation and contraction of said another actuator.

10. The helicopter according to claim 6, wherein said actuator is coupled to said dynamic mass through said motion direction converting mechanism.

11. A vibration reducing method of a helicopter, comprising:
    preparing a helicopter which comprises:
    a main rotor with blades,
    a helicopter main body having a vibration damping object and configured to rotate said main rotor, and
    a vibration reducing apparatus having a vibration damping unit provided to the vibration damping object and a control unit;
    generating a drive signal based on a number of rotations of said main rotor and an acceleration of said helicopter main body; and
    vibration-damping the vibration damping object of said helicopter main body by driving said actuator in response to the drive signal.

* * * * *